(12) United States Patent
Greeson

(10) Patent No.: US 6,779,489 B2
(45) Date of Patent: Aug. 24, 2004

(54) AUTOMATED CARRIER-BASED PEST CONTROL SYSTEM

(76) Inventor: John Stuart Greeson, 320 E. Cheyenne Rd., Dexter, NM (US) 88230

( * ) Notice: Subject to any disclaimer, the term of this patent is extended or adjusted under 35 U.S.C. 154(b) by 0 days.

(21) Appl. No.: 10/616,609

(22) Filed: Jul. 9, 2003

(65) Prior Publication Data
US 2004/0007191 A1 Jan. 15, 2004

Related U.S. Application Data

(63) Continuation-in-part of application No. 09/810,904, filed on Mar. 15, 2001, now Pat. No. 6,651,589.
(51) Int. Cl.[7] .............................................. A01K 29/00
(52) U.S. Cl. ...................................................... 119/665
(58) Field of Search ................................ 119/665, 656, 119/658, 666, 667, 669, 668

(56) References Cited

U.S. PATENT DOCUMENTS 6,651,589 B2 * 11/2003 Greeson ...................... 119/665

* cited by examiner

Primary Examiner—Charles T. Jordan
Assistant Examiner—Elizabeth Shaw
(74) Attorney, Agent, or Firm—Ray R. Regan (57) ABSTRACT

An automated carrier-based pest control system is provided, and includes a substantially automated sprayer. The system also includes a container in fluid communication with the substantially automated sprayer for holding a mixture of carrier-based ingredients, including one or more ingredients, for discharge from the substantially automated sprayer. Also includes is one or more discharge control units operably connectable to the substantially automated sprayer and to the container for regulating discharge of the mixture of carrier-based ingredients.

26 Claims, 5 Drawing Sheets

AUTOMATED CARRIER-BASED PEST CONTROL SYSTEM

CROSS-REFERENCE TO RELATED APPLICATION

This application is a continuation-in-part from a continuation-in-part application, application Ser. No. 09/810,904, entitled an Apparatus for Variably Discharging Ingredients on an Animal, filed Mar. 15, 2001 now U.S. Pat. No. 6,651,589, for which the U.S. Patent Office has issued a notice of allowability to the same sole inventor named in this application.

FIELD OF THE INVENTION

The present invention pertains generally to controlling pests on an animal. More particularly, the present invention pertains to a substantially fully automated system for applying carrier-based mixture containing one or more pesticides to bovines. The present invention is particularly, but not exclusively, useful for variably discharging carrier-based mixtures on cows in a dairy herd.

BACKGROUND OF THE INVENTION

Control and management of pests has proven challenging, costly, illusive, and frequently ineffective. Pests of concern to dairy herdsman include (i) not only the conventional class of arthropods and related classes and orders known as muscoid and nonmuscoid flies, but also (ii) arachnids, a class of mainly terrestrial arthropods comprising spiders, scorpions, mites, ticks, and the like, (iii) ectoparasites, which are parasites living on the surface of an animal, and (iv) endoparasites, parasites living within an animal. Muscoid and nonmuscoid flies, for example, in a wide variety of species, cluster synanthropically to humans and their domestic animals, or in close proximity to humans and domesticated animals such as cows.

Pests are of concern because of their dramatic impact on the economics of animal production, a commercial industry constituting a significant contribution to the gross national product of the United States. The dairy cattle industry has been estimated to produce $12 billion annually. The several different species and classes of flies commonly found on livestock and livestock premises may cause a number of problems, including irritating cows so severely that milk production suffers; transmitting disease pathogens; increasing enteric (intestinal) diseases among humans associated with cow herds; violating regulatory rules and regulations, and generating a host of related problems.

A variety of devices, apparatus and methods have been proposed for controlling pests among cattle, including dairy cows. Except for the invention disclosed in U.S. Pat. No. 6,230,660 B1, issued May 15, 2001 to the sole inventor named in this application, and in the co-pending and allowed application cross-referenced in this document, ("Prior Inventions"), none has proven effective in achieving the level of control demanded by industry operators, or providing substantially automated control of pest populations. No other solutions provide apparatus and methods for varying the rate and amount of discharge of ingredients used to combat pests, particularly the rate and amount of chemical discharge, to reduce costs while maintaining pest control on and around animals.

Known proposals for controlling flies attracted to cattle include burying parasites in soil beneath the surface of the soil on which cattle are penned. Other pests, including nematodes, have been introduced into herd locations in hopes of fly control. Flytraps using bait attractants have been used. Those techniques have proven ineffective in controlling fly populations attracted to cattle pens. Parasites achieve control of only a small portion of a fly population, and then only temporarily. Parasites reproduce more slowly than the rate at which flies reproduce, and their hatch rates are unreliable and unpredictable. An effective parasite population also may be reduced because parasites die or fly way. Use of parasites as a method for attempting to control flies among cattle is labor intensive, therefore expensive, usually making the solution unacceptable to an operator of a cattle business. Virtually no control is achieved using nematodes. Nematodes are not suitable for use in acidic soils. Because of the large amounts of manure and urine produced by multiple pens of cattle, all soil used for cattle becomes acidic. In addition, use of nematodes is impractical because nematodes must be applied or introduced into a herd at night, only after rainfall, and reintroduced frequently to achieve any measure of success in controlling pests on an animal and animal herd. No marked reduction of a pest population occurs with use of fly traps. Flytraps, for example, rely on bait. No bait, however, has proven effective for flies, particularly on large tracts of land used to pen large cattle herds.

Spraying or fogging chemicals on cattle has proven marginal in achieving control of flies for long periods of time. Fogging causes droplet drift, so fogging is not cost effective. For similar reasons, aerial spraying has proven no more effective than use of fly parasites, nematodes, and fly traps using bait attractants.

Other proposals for controlling pests among cattle include feeding cows oral larvicide and applying residual pesticides on the underside of shaders. No significant long-term reduction in the fly population has been observed using an oral larvicide, primarily because no chemical that might work effectively against flies may be fed orally to milking cattle. Even more primitive devices have been used, such as back rubbers, both manuals and automated. A manual back rubber applicator requires an operator to periodically remove, dip into a chemical, and reinstall a rubber device above the back of a cow that walks beneath the rubber device. No noticeable difference, however, in fly population has been observed using this method, and automated variations have proven no more effective. Ear tags, or other apparatus attachable to parts of an animal's body, containing a liquid chemical or pesticide dispensable on an animal, also have not satisfied the industry requirements for an apparatus that provides substantially complete control of the fly population in the form of a substantially automated system requiring relatively little attention during operation. Ear tags or similar apparatus connectable to parts of an animal body cannot be designed to release or apply sufficient chemicals either to an animal or to flies.

Attempting to control pests by spraying underneath shaders, direct spraying of roosting flies, and spraying vegetation near cattle pens, also are ineffective. Those techniques may eliminate problems associated with food and water contamination, but are labor intensive and expensive. An average dairy herd, for example, requires six to seven hours to complete one such spraying cycle, a cycle that must be repeated often to achieve even minimal control. A problem encountered by these methods is the tendency of flies to change roosting areas regularly, requiring an operator to hunt fly roosting areas to effectively induce a spray.

Larvicide spraying has not proven feasible because of the huge volume of water required to penetrate at least three inches below the surface of soil where fly larvae feed. The typical service truck carries only 500 gallons of water, and for a cattle herd held in a common arrangement of twelve pens, the cost of frequent larvicide applications is prohibitive.

As the inventor named in this document has disclosed in prior applications and patents, a mixture that includes at least one chemical and at least one oil, although expensive, has proven the most effective combination of ingredients to control pests among bovines, particularly in dairy environments. As used in this document, the term "carrier-based chemical mixture" or "mixture of carrier-based ingredients" includes a wide variety of carriers such as oil, silicon, polymers, gels, and thickening agents that are chemically inert and that are useful in connection with the present invention. Also as used in this document, the term "chemical" includes, as non-exclusive examples, pyrethroids, organopolysiloxanes, organophosphates, and systemic endoparisites, among others. Accordingly, it would be of considerable advantage to provide an automated carrier-based pest control system for applying a mixture of carrier-based ingredients on bovines assembled in herds.

SUMMARY OF THE INVENTION

The present invention provides important advantages over present technology. At least one advantage of the present invention is the capability for variably discharging ingredients on an animal. The term "variably discharging," and equivalent forms used in this document include discharge of a mixture of carrier-based ingredients at different times, in differing rates, in different amounts, in varying spray patterns, either continuously, or in one or more interrupted sequences. The term "different spray patterns" includes at least the conventional substantially funnel-shaped spray pattern associated with nozzles, as well as a substantially focused stream or jet of a mixture of carrier-based ingredients. The term "variably discharging" also contemplates random discharges from the system. These features of the present invention significantly reduce waste of expensive chemicals, and consequently the cost of pest control, while achieving substantially full control of pests. Environmental hazards are substantially reduced. The apparatus of the present invention is so efficient that little chemical is wasted, thus affording the user a significant chemical cost reduction.

Accordingly, at least one object of the present invention is to provide an automated carrier-based pest control system for applying a mixture of carrier-based ingredients on bovines assembled in herds. Such a system, preferably in a permanent installation for controlling pests on cattle, allows regular, repetitive, effective and thorough application of the best and most appropriate combination of ingredients, including carrier-based chemical mixtures, while substantially eliminating user involvement during operation of the apparatus.

Another object of the present invention is the use of a variety of sensors, including units that include sensors in combination with counters and other devices for applying carrier-based ingredients on bovines. The sensors may include diffused deflective infrared sensors, which also may be used with a plurality of pulse/speed indicators, to cooperate in discharging ingredients based on the rate of movement of the animal.

Still another object and advantage of the present invention is the inclusion of one or more sensors operatively connectable to the discharging means for regulating discharge of the carrier-based mixture of chemicals consistent with, and as a function of, the speed of the animal.

Another object and advantage of the present invention includes a pest control apparatus that includes one or more sensors that can control discharge of the carrier-based mixture of ingredients regardless of the location of the animal in relationship to the sprayer.

Yet another object and advantage of the present invention is responsive to the fact that insects may not cluster or be distributed uniformly or homogeneously on an animal's body considered as a whole. Rather, insects may cluster on one or more locations on an animal. For example, insects may mass along the back of a cow, on the head of a cow, or on the stomach of a cow. It is therefore an object of the present invention to provide means for varying not only the configuration of the sprayed discharge of the carrier-based mixture of chemicals from the apparatus, but also the locations on the animal anatomy that the discharged mixture may be directed in varying amounts.

Another object and advantage of the present invention is an automated carrier-based pest control system for applying a mixture of carrier-based ingredients on bovines assembled in herds that respectively are easy to use and to practice, and which are cost effective for their intended purposes.

These and other advantages are achieved in the present invention by providing an automated carrier-based pest control system for applying a mixture of carrier-based ingredients on bovines assembled in herds in which the ingredients are dischargeable through one or more regulated and adjustable nozzles that may be attached to a unitary sprayer, or mounted on a gate or dividing bar used to temporarily inhibit passage of cattle through a permanent installation for controlling pests in a herd. Nozzle flow is adjustable and may be regulated, using a valve, solenoid, or mechanical means to adjust the configuration of the spray. As indicated, an animal's presence, location, and movement may be monitored by not only a sensor, but a sensor-timer combination or similar combination of sensors.

The system of the present invention also includes one or more programmable controllers for variable discharge rates from the spray apparatus on the animal, as well as a variety of timers for scheduling discharge of the ingredients at any desired time interval. The system also provides a plurality of pulse/speed devices for discharging ingredients as a function of the position of the animal in relation to the spray apparatus.

It will become apparent to one skilled in the art that the claimed subject matter as a whole, including the structure of the apparatus, and the cooperation of the elements of the apparatus, combine to result in a number of unexpected advantages and utilities. The advantages and objects of the present invention, and features of an automated carrier-based pest control system will become apparent to those skilled in the art when read in conjunction with the accompanying following description, drawing figures, and appended claims.

The foregoing has outlined broadly the more important features of the invention to better understand the detailed description that follows, and to better understand the contribution of the present invention to the art. Before explaining at least one embodiment of the invention in detail, it is to be understood from the invention is not limited in application to the details of construction, and to the arrangements of the components, provided in the following description or drawing figures. The invention is capable of other embodiments, and of being practiced and carried out in various ways. Also, the phraseology and terminology employed in this disclosure are for purpose of description, and should not be regarded as limiting.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The novel features of this invention, and the invention itself, both as to structure and operation, are best understood from the accompanying drawing, considered in connection with the accompanying description of the drawing, in which similar reference characters refer to similar parts, and in which:

DESCRIPTION OF A PREFERRED EMBODIMENT

Briefly, the present invention provides an automated carrier-based pest control system. As shown in FIGS. 1–6, an automated carrier-based pest control system 10 is provided for discharging an carrier-based pesticide on an animal 12 such as a cow 12'. Automated carrier-based pest control system 10, in its broadest context, includes a substantially automated sprayer 14, a container 16 in fluid communication with substantially automated sprayer 12, and one or more discharge control units 18 operably connectable to sprayer 14 and to container 16.

Figure 1:
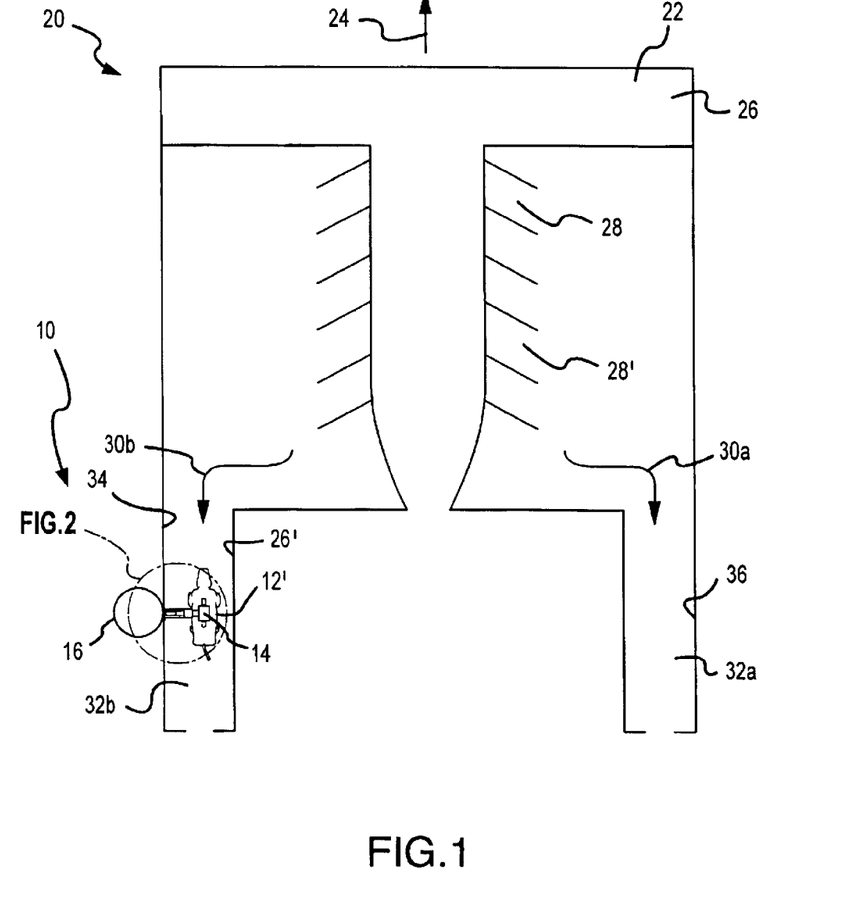
FIG. 1 is top plan view of a representative permanent installation for controlling pests among dairy cattle, and the automated carrier-based pest control system of the present invention.
Figure 2:
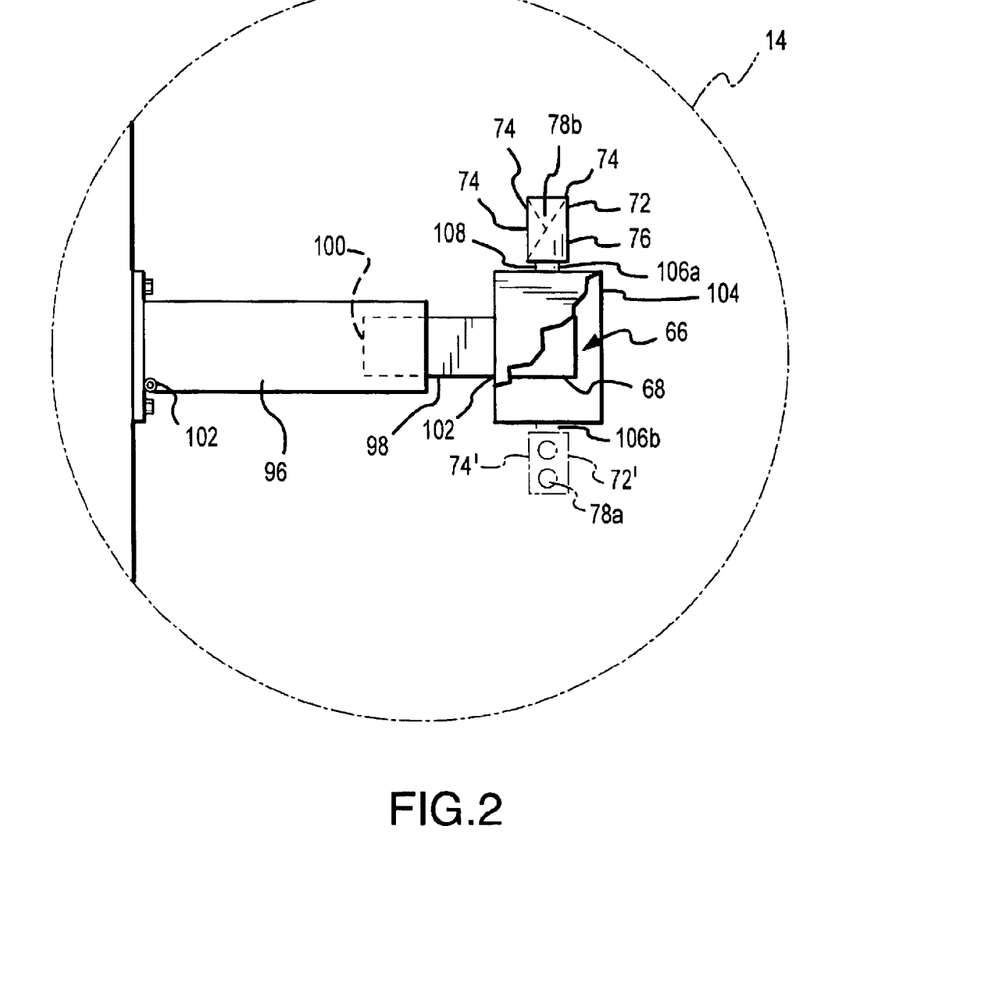
FIG. 2 is a top plan view of a substantially automated sprayer as shown in FIG. 2.

More specifically, FIG. 1 shows an automated carrier-based pest control system 10 according to the present invention in an operative environment. An animal 12 is shown in FIG. 1 moving past and beneath the automated sprayer 14, a cow 12'. FIG. 2 shows a representative, conventional, but not standard, diagrammatic plan of a permanent installation 20 for controlling pests on a dairy herd. Permanent installation 20 includes an enclosure 22. FIG. 2 also shows a first arrow 24 indicating the direction toward outdoor pens (not shown) that may be adjacent enclosure 22 for holding one or more cows 12'. Also shown in FIG. 2 is a parlor area 26, an area where one or more cows 12' may be temporarily housed or held. As further shown in FIG. 2, representative enclosure 22 includes one or more milking stalls 28. After cow 12' is milked in a milking stall 28', cow 12' is directed out of enclosure 22 in the direction shown by curved arrows 30a,b through an exit alley 32a,b.

Figure 3:
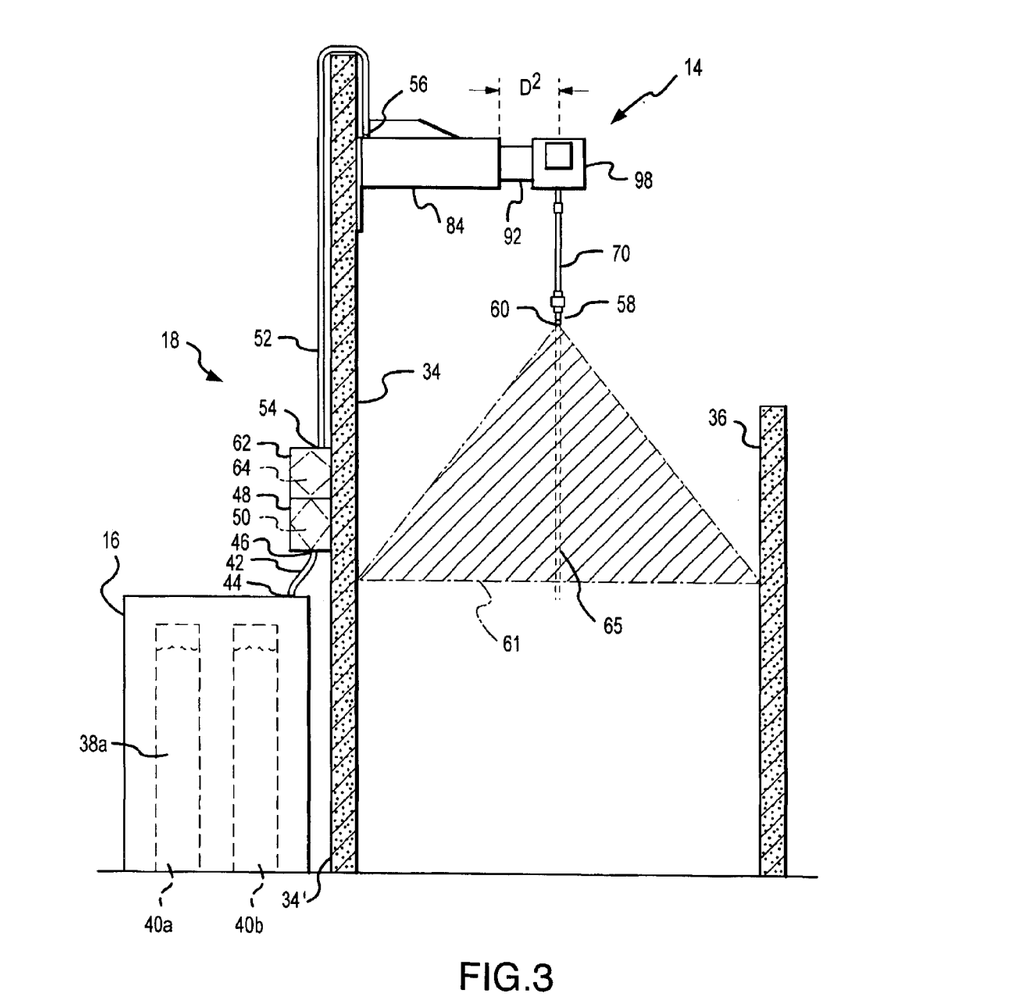
FIG. 3 is a front view of representative permanent installation for controlling pests among dairy cattle, and the automated carrier-based pest control system of the present invention.

As shown by cross-reference between FIGS. 1 and 3, automated carrier-based pest control system 10 is shown mounted on a first wall 34 inside enclosure 22 to enable cow 12' to pass beneath sprayer 14. As further shown in FIG. 1, sprayer 14 also is shown in FIG. 2. As will be apparent to one skilled in the art, sprayer 14 may be mounted on any number of first walls 34 depending on the size of the permanent installation for controlling pests on cattle, and the size of the herd. A second inside wall 36 of enclosure 22, and one or more cows 12' could be directed through exit alley 32b.

As shown by reference to FIG. 3, automated carrier-based pest control system 10 includes container 16. Container 16 is provided for holding one or more carrier-based ingredients 38a,b shown diagrammatically in FIG. 3. As will be evident to one skilled in the art, the one or more carrier-based ingredients could be separated as shown by reservoirs 40a,b, or could be mixed in a single reservoir 40a. As used in this document, the term "carrier-based chemical mixture" or "mixture of carrier-based ingredients" includes a wide variety of carriers such as oil, silicon, polymers, gels, and thickening agents that are chemically inert.

Automated carrier-based pest control system 10, as indicated, also includes one or more discharge control units 18, as perhaps best shown by cross-reference between FIGS. 2–6. Discharge control units 18 is in fluid communication with sprayer 14 that is in fluid communication with container 16 to enable automated carrier-based pest control system 10 to discharge the one or more ingredients 38a,b in container 16 on cow 12'. The one or more carrier-based ingredients 38a,b dischargeable by one or more discharge control units 18 includes one or more chemicals containable in container 16 which may include one or more reservoirs 40a,b as best shown in FIG. 3.

As best shown by cross-reference between FIGS. 1–3, in a preferred embodiment of the present invention, the components placing the one or more ingredients 38a,b in fluid communication with one or more discharge control units 18 include at least one short hose 42 having a lower 40 end and an upper end 42. Lower end 40 of short hose 42 is insertable into container 16 or into one or more reservoirs 40a,b. Upper end 42 of short hose 42 is connectable to a first case 48. In a preferred embodiment of the present invention, as shown by reference to FIG. 3, first case 48 may be mounted on first wall 34. First case 48 is provided for housing a pump 50 shown diagrammatically in FIG. 3. In a preferred embodiment of the present invention, pump 50 housed in first case 48 is an air operated pump.

As also shown in FIG. 3, in a preferred embodiment of one or more discharge control units 18, components placing the one or more carrier-based ingredients in one or more reservoirs 40a,b in fluid communication with one or more discharge control units 18 includes at least one long hose 52 having a bottom end 54 and a top end 56. Bottom end 54 of long hose 52 is operatively connectable to pump 50 located in first case 48. Top end 56 of long hose 52 is connectable to an adjustable bracket (more fully described below) of one or more discharge control units 18.

The present invention also includes a dispenser 58 as shown in FIG. 3. In a preferred embodiment of the present invention, dispenser 58 is a nozzle 60. Using one nozzle 60, full coverage of cow 12' with discharges of carrier-based ingredients 38a,b contained in one or more reservoirs 40a,b is achieved as shown diagrammatically in FIG. 3 by cone 61, representing discharge of one or more carrier-based ingredients 38a,b from nozzle 60 on cow 12'. As also shown diagrammatically in FIG. 3 by dashed lines is at least one other discharge configuration from sprayer 14 in the form of a substantially focused stream 65 that also may be described as a jet spray of one or more carrier-based ingredients 38a,b from nozzle 60 on cow 12'. The use of substantially focused stream 65 is particularly useful in connection with the application of one or more carrier-based ingredients 38a,b that are used to treat endoparsites to ensure penetration through the skin of cow 12' to treat what is essentially a systemic problem.

As also shown perhaps best in FIG. 3, the present invention includes a second case 62. Second case 62 houses a timer assembly 64 shown diagrammatically in FIG. 3. Timer assembly 64 may be used for scheduling discharge of the one or more ingredients on cow 12'. Timer assembly 64 is electrically connected to container 16 and one or more discharge control units 18. Timer assembly 64 supplies electrical power to nozzle 60. Timer assembly 64 is programmable to be set for the hour, day, week and month to apply or discharge one or more carrier-based ingredients 38a,b, thus making the system substantially automatic, and insuring that applications of pesticide to animal 12 will be performed regularly and systematically. Alternatively, timer assembly 64 may be programmed to discharge one or more carrier-based ingredients 38a,b in a random manner to adjust to the habits of a herd, or the operational characteristics of those managing a herd.

Figure 4:
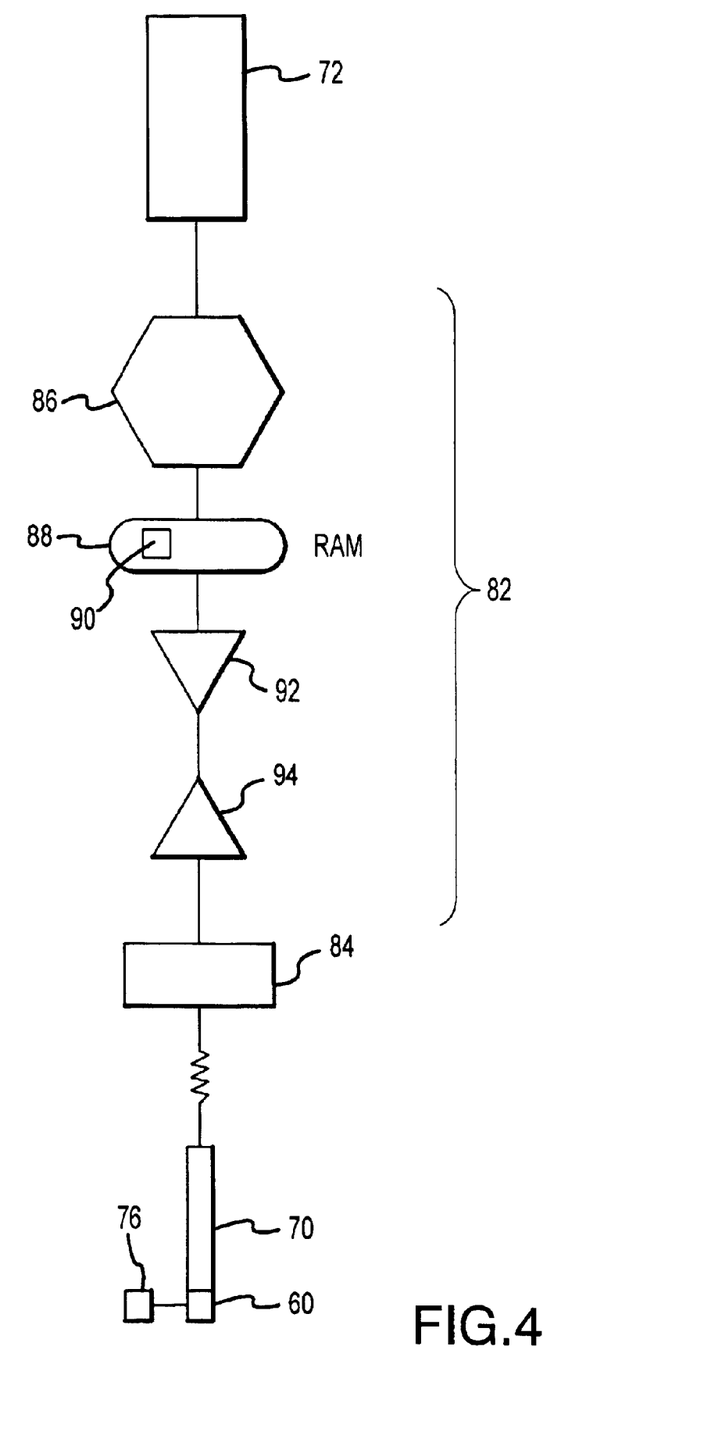
FIG. 4 is a schematic view of elements comprising the controller.

As best shown by cross-reference between FIGS. 2 and 4, the present invention also includes a valve 66. Valve 66 controls flow and pressure of one or more carrier-based ingredients 38a,b to be discharged by one or more discharge control units 18 on cow 12'. A variety of valves may be used in the present invention. In the preferred embodiment of the present invention, valve 66 is a control valve known as a solenoid valve 68. In a preferred embodiment of the present invention, solenoid valve 68 is dimensioned to be at least 5/16" in diameter. One or more discharge control units 18 include a drop hose 70 as shown in FIG. 3. In combination with solenoid valve 68, drop hose 70 maintains substantially constant pressure on carrier-based ingredients 38a, b in one or more discharge control units 18, particularly between solenoid valve 68 and drop hose 70 connected to nozzle 58.

As shown by cross-reference between FIGS. 2 and 3, automated carrier-based pest control system 10 also includes a sensor 72 for detecting cow 12'. Recent innovations in the technology of sensors afford a variety of useful sensing devices useable with the present invention. Traditional sensors are opposed through-beam devices, requiring separate emitters and receivers; that no longer is a limitation. Retroflective sensors have both an emitter and receiver in the same housing; a light beam may be established between the sensor and a special retroflective target, including the darker body of a cow 12'. Diffuse, or proximity mode sensors, also contain both an emitter and receiver in the same housing, but the target, again including the surface of a target like a cow 12', reflects back to the receiver adequate light to be processed by special lenses in a broad, diffused pattern. Diffuse reflective infrared sensors, however, use lenses to collimate, or make parallel, emitted light and received light. For such sensors, beam patterns may be plotted and calculated to determine responses to a beam based on a target. Convergent beam sensors, like diffuse sensors, use additional optics to produce a small but well-defined sensing area. Ultrasonic sensors used ultrasound for opposed mode or reflective proximity mode detection. Ultrasonic sensors may measure time delays between emitted sound and a returned echo, and can achieve high correlation between output and sensing distance. Most sensors are used for presence sensing, and offer a relay as an output switching device that usually is open or closed ("on" or "off"). Ultrasonic sensors, as a class or mode, also are categorized by transducer type, either electrostatic or piezoelectric. Sensor repeatability is determinable for all sensors. Modulation schemes count or determine a defined number of received light pulses before responding to a light signal before a sensor is allowed to switch. The "on" response time is equal to the total amount of time taken for the sensor to count, or demodulate, the required number of pulses. Because the sensing event, however, can occur at any time during a modulation cycle, or period, actual time between the sensing event and the sensor's output change can vary; the variation is the sensor's repeatability. As indicated, because of advancements in the technology of sensors, a variety of sensors may be used in the practice of the present invention.

In a preferred embodiment of the present invention, sensor 72 may be combined in a unitary or single sensor-timer 74' to include a timer to replace or back-up timer assembly 64. Sensor 72 also may be an ultrasonic sensor 74. In an alternative embodiment of the present invention, a diffused deflective infrared sensor 76 may be used. Diffused deflective infrared sensor 76 operates substantially similar to ultrasonic sensor 74, but emits an infrared beam of light at a target, and receives the light beam response or reflection from the target based on triangulations. Accordingly, diffused deflective infrared sensor 76 need not be placed to the side of the target, such as cow 12', but may be positioned above.

As shown perhaps best in FIG. 2, ultrasonic sensor 74, and diffused deflective infrared sensor 76, may also be used in conjunction with a plurality of pulse-speed indicators 78a, b as shown in FIG. 2. Pulse speed indicators 78 measure the speed of movement of cow 12' between pulse-speed indicator 78a and pulse-speed indicator 78b, sending a signal to adjust the amount of one or more carrier-based chemicals 38a,b to discharge on cow 12'. The velocity of movement of animal 12 across the path of pulse-speed indicator 78a begins a timing sequence for animal 12 beginning on detection. Timing ends when pulse-speed indicator associated with pulse-speed indicator 78b. A programmable logic chip or similar device (not shown) for determining the amount of carrier-based ingredients 38a,b to discharge on each passing animal 12 is activated. Pulse speed indicators 78a,b would be particularly useful as a cost-effective limitation on the amount of expensive chemicals in the one or more carrier-based ingredients 38a,b to apply to a particular animal 12.

In a preferred embodiment of the present invention, automated carrier-based pest control system 10 includes means 80 operatively connectable to sensor 72 for variably discharging one or more carrier-based ingredients 38a,b on cow 12'. As shown in FIG. 4, the preferred means 80 for the present invention is a controller 82. Controller 82 is programmable and is operatively connected to valve 66 and to sensor 72. The capability of the present invention to discharge carrier-based ingredients 38a,b either continuously, randomly, or in one or more interrupted sequences of applications, using controller 82 is of considerable advantage. At least one significant advantage is reduction of costs, particularly chemical costs. As explained in this document, chemicals used to control pests on and around cows 12' are very costly. Because coverage on a cow 12' remains effective, as provided by the present invention, any reduction in chemical costs is a significant advantage over current apparatus and methods.

As shown in FIG. 4, controller 82 includes one or more relays and timers for repeating on-delay off-delay functions that may continuously turn valve 66 on and off while receiving a signal from timer assembly 64 or from unitary-sensor timer 76'. A programmable logic card 76, shown schematically in FIG. 4, is located in, or is operatively connectable to, sensor 72. As indicated in this document, current may be supplied to sensor 72, which in a preferred embodiment of the present invention, is a combination unitary sensor-timer 74. Combination unitary sensor-timer 74 emits a sound or light wave when an object such as cow 12' comes within a desired distance of combination unitary sensor-timer 74. A relay, preferably a first solid-state relay 86, is capable of processing a signal. The signal is transmitted to a random access memory storage (RAM) 88. Random access memory storage 88 has a preset program or one or more chips 90 associated with random access memory storage 88. The preset program or one or more chips 90 controls interval relay 92, which controls the length of total discharge time if cow 12' remains in the sensing window of sensor 72 or unitary sensor-timer 76'. Interval relay 92 controls discharge of the one or more carrier-based ingredients 38a,b by determining the length of time controller 82 will be operative. If cow 12' ceases forward progression past the present invention, interval relay 92 turns off the present invention until cow 12' clears the sensing area of sensor 72 or unitary sensor-timer 76'. A repeat cycle timer 92 also may included in controller 82. When cow 12' clears the area, interval relay 92 sends power to the pulse output relay 94, which begins to cycle on and off as programmed.

Unexpected and significant results occur by use of the present invention. Extensive nozzle testing using a 350 SUS or greater viscosity liquid, or combination of liquids as potential carrier-based ingredients 38a,b to reduce chemical usage, and thus make the present invention even more economical for dairies, indicates that use of certain nozzles requires more pressure to achieve acceptable spraying patterns in liquids of such viscosity. At some pressures, small droplets drift off a target such as cow 12'. Droplets in the 30 to 60 micron range dispersed at a rate of 0.75 to 1.00 feet per second, indicating potential health risks to cow 12'. An acceptable fall rate is 2.00 to 3.00 feet per second. Controller 82 offers the advantages of decreasing health risks, while also decreasing costs of operation, while maintaining effective coverage. The variability of the present invention also is responsive to the fact that insects may not cluster or be distributed uniformly or homogeneously on an animal's body considered as a whole. Rather, insects may cluster on one or more locations on an animal. For example, insects may mass along the back of cow 12', on the head of cow 12', or on the stomach of cow 12'. The present invention allows a user to vary not only the configuration of the sprayed discharge of the carrier-based mixture of chemicals, but also the locations on the animal anatomy that the discharged mixture may be directed in varying amounts.

Figure 5:
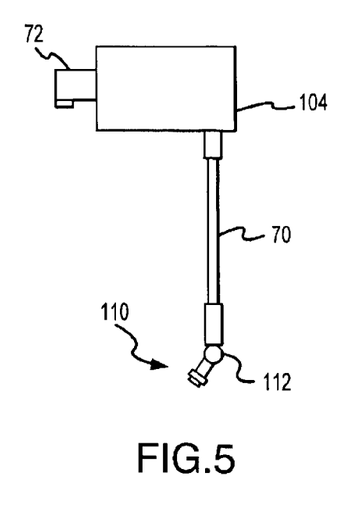
FIG. 5 is a side view of the swivel nozzle of the present invention.
Figure 6:
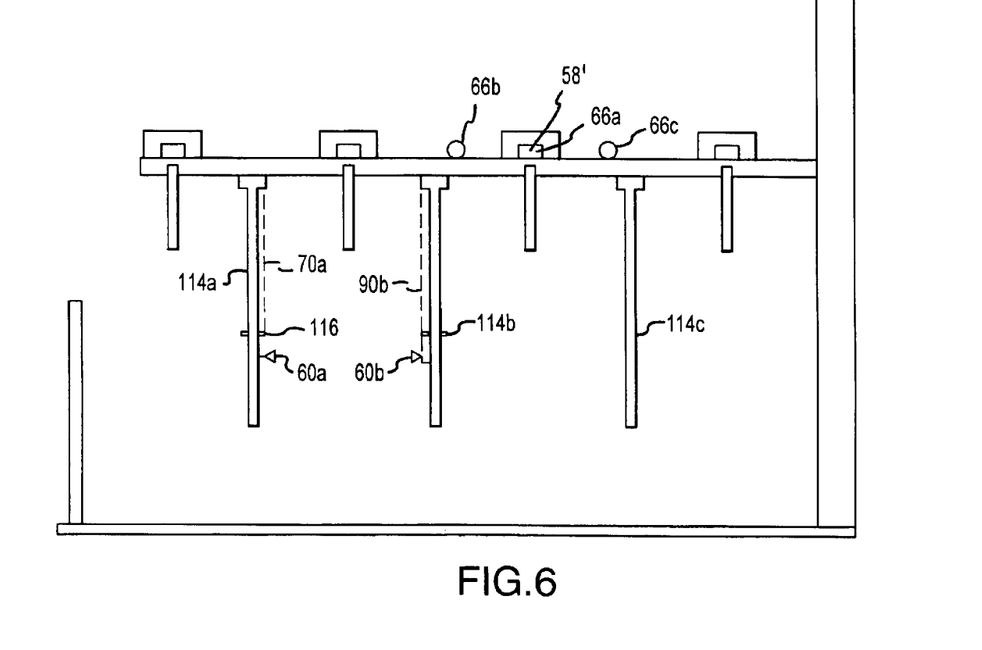
FIG. 6 is front view showing a plurality of divider bars, and an alternative deployment of valves.

As shown by cross-reference between FIGS. 5 and 6, the present invention also includes one or more members demountably coupled to automated carrier-based pest control system 10 for selectively positioning sprayer 14 in relation to animal 12. Such members include a bracket 96. Bracket 96 includes a boom 98 formed with a first end 100 and a second end 102. Second end 102 of boom 98 is attachable to a housing pod 94. Bracket 96 includes an arm 106. Arm 106a shows a preferred embodiment of the present invention, and arm 106b shows an alternative, among many, of where arm 106 may be located. Sensor 72 is mountable on proximal end 108 of arm 106. As will be apparent to one skilled in the art, arm 106 may be located at any of a variety of locations on housing pod 104. In at least one alternative embodiment of the present invention, a swivel nozzle 110 is provided, as shown in FIG. 5. Swivel nozzle 110 includes a ball joint 112 in fluid communication between drop hose 70 and nozzle 110. Swivel nozzle 110 is also is capable of adjusting the configuration of the discharge of one or more carrier-based ingredients from swivel nozzle 110. Swivel nozzle 110 also is multi-positionable. In a further embodiment of the present invention, a plurality of divider bars 114a–c are provided as shown in FIG. 6. Divider bars 114a–c may be manufactured from any materiel. In a preferred embodiment of the present invention, plurality of divider bars 114 are made of any plastic, fibre glass, nylon, or resin material, shaped in a tubular rod, and contribute to keeping one or more cows 12' separated while passing a plurality of installations of the present invention. As also shown in FIG. 6, one or more nozzles 60a,b on drop hoses 70a,b are secured to divider bars 114 with a clamp 116a–c to provide discharge toward the side of cow 12' rather than from the top. Alternatively, as also shown in FIG. 6, a three-way valve 66', or three separate one-way valves 66a–c may be included with the present invention to further limit discharge of chemicals in one or more carrier-based ingredients 38a,b.

The apparatus for variably discharging one or more ingredients on an animal, shown in drawing FIGS. 1 through 6, is but one embodiment of the present invention, is not intended to be exclusive, and is not a limitation of the present invention. While the particular apparatus for variably discharging one or more ingredients on an animal as shown and disclosed in detail in this instrument is fully capable of obtaining the objects and providing the advantages stated, this disclosure is merely illustrative of the presently preferred embodiments of the invention, and no limitations are intended in connection with the details of construction, design or composition other than as provided and described in the appended claims.

While the an automated carrier-based pest control system 10 shown in drawing FIGS. 1 through 6 includes one embodiment of the present invention, it is merely one embodiment of the invention, is not intended to be exclusive, and is not a limitation of the present invention. While the particular automated carrier-based pest control system 10 as shown and disclosed in detail in this instrument is fully capable of obtaining the objects and providing the advantages stated, this disclosure is merely illustrative of the presently preferred embodiments of the invention, and no limitations are intended in connection with the details of construction, design or composition other than as provided and described in the appended claims. Claim elements and steps in this document have been numbered solely as an aid in readability and understanding. The numbering is not intended to, and should not be considered as, intending to indicate the ordering or sequencing of elements and steps in the following claims.

What is claimed is:

1. An automated carrier-based pest control system, comprising:
   a substantially automated sprayer;
   a container in fluid communication with the substantially automated sprayer for holding a carrier-based mixture of ingredients for discharge from the substantially automated sprayer,
      wherein the carrier-based mixture of ingredients includes at least one chemical;
   one or more discharge control units operably connectable to the substantially automated sprayer and to the container for regulating discharge of the carrier-based mixture of ingredients,
wherein the one or more discharge control units includes means for discharging the carrier-based mixture of ingredients on an animal at any time and at any time interval.

2. An automated carrier-based pest control system as recited in claim 1, wherein the carrier is selected from the group of carriers consisting of an oil, silicon, polymers, gels, and thickening agents.

3. An automated carrier-based pest control system as recited in claim 2, wherein the carrier-based mixture of ingredients is composed of not less than 3.00% oil by volume.

4. An automated carrier-based pest control system as recited in claim 3, wherein oil is mineral oil.

5. An automated carrier-based pest control system as recited in claim 4, wherein the at least one chemical includes a pesticide.

6. An automated carrier-based pest control system as recited in claim 5, wherein the at least one chemical is selected from the group of chemicals consisting of pyrethroids, organopolysiloxanes, organophosphates, and systemic endoparisitides.

7. An automated carrier-based pest control system as recited in claim 6, further comprising one or more members demountably coupled to the system for positioning the substantially automated sprayer in relation to the animal.

8. An automated carrier-based pest control system as recited in claim 7, wherein the one or more discharge control units includes a sensor-counter combination.

9. An automated carrier-based pest control system as recited in claim 8, wherein the sensor-counter combination is programmable for random or selectably-random discharge of the mixture of carrier-based ingredients.

10. An automated carrier-based pest control system as recited in claim 9, wherein the substantially automated sprayer includes at least one banding nozzle for discharging the carrier-based mixture of ingredients in a substantially focused stream.

11. An automated carrier-based pest control system as recited in claim 10, wherein the one or more discharge control units includes a solenoid valve ¼" diameter or larger.

12. An automated carrier-based pest control system as recited in claim 11, wherein the one or more discharge control units includes an accumulator.

13. An apparatus for discharging one or more carrier-based ingredients on a cow, comprising:
a sprayer formed with at least one nozzle,
wherein the at least one nozzle includes means for applying on the cow one or more carrier-based ingredients in a variety of configurations;
a container connectable to the sprayer for holding the one or more carrier-based ingredients;
means operationally couplable to the sprayer and the container for regulating discharge of the one or more carrier-based ingredients; and
means positionable on the discharge regulating means for detecting but not restraining the cow during discharge of the one or more carrier-based ingredients.

14. An apparatus for discharging one or more carrier-based ingredients on a cow as recited in claim 13, wherein the applying means includes an adjustable nozzle.

15. An apparatus for discharging one or more carrier-based ingredients on a cow as recited in claim 14, wherein the apparatus is energized by direct current.

16. An apparatus for discharging one or more carrier-based ingredients on a cow as recited in claim 13, wherein the applying means includes a plurality of adjustable nozzles mountable on one or more dividing bars.

17. An apparatus for discharging one or more carrier-based ingredients on a cow as recited in claim 13, wherein the discharge regulating means includes a timer.

18. An apparatus for discharging one or more carrier-based ingredients on a cow as recited in claim 13, wherein the discharge regulating means includes a programmable controller for selectively and randomly applying on the cow one or more carrier-based ingredients.

19. An apparatus for discharging one or more carrier-based ingredients on a cow as recited in claim 13, wherein the detecting means includes a unitary sensor-timer.

20. An apparatus for discharging one or more carrier-based ingredients on a cow as recited in claim 13, wherein the detecting means includes a unitary sensor-timer mounted on one or more dividing bars.

21. A pest control apparatus, comprising:
a sprayer;
means in fluid communication with the sprayer for holding a carrier-based mixture of ingredients for application on an animal; and
means for discharging the carrier-based mixture of ingredients on the animal.

22. A pest control apparatus as recited in claim 21, wherein the holding means includes at least one container.

23. A pest control apparatus as recited in claim 21, wherein discharging means includes at least one discharge control unit operably connectable to the sprayer.

24. A pest control apparatus as recited in claim 21, wherein the discharging means includes means for discharging varying amounts of the carrier-based mixture of ingredients at one or more specific locations on the anatomy of the animal.

25. A pest control apparatus as recited in claim 21, further comprising one or more sensors operatively connectable to the discharging means for regulating discharge of the carrier-based mixture of ingredients in relationship to the speed of the animal.

26. An pest control apparatus as recited in claim 21, further comprising one or more members demountably connectable to the apparatus for positioning the sprayer in relationship to the animal.

* * * * *